United States Patent
Fakoor et al.

(10) Patent No.: US 12,217,137 B1
(45) Date of Patent: Feb. 4, 2025

(54) META-Q LEARNING

(71) Applicant: Amazon Technologies, Inc., Seattle, WA (US)

(72) Inventors: Rasool Fakoor, San Jose, CA (US); Alexander Johannes Smola, Sunnyvale, CA (US); Stefano Soatto, Pasadena, CA (US); Pratik Anil Chaudhari, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 933 days.

(21) Appl. No.: 17/039,447

(22) Filed: Sep. 30, 2020

(51) Int. Cl.
*G06N 20/00* (2019.01)

(52) U.S. Cl.
CPC .................. *G06N 20/00* (2019.01)

(58) Field of Classification Search
CPC .......................................... G06N 20/00
USPC ........................................... 706/12
See application file for complete search history.

(56) References Cited

U.S. PATENT DOCUMENTS

| | | | | |
|---|---|---|---|---|
| 10,963,754 | B1* | 3/2021 | Ravichandran | G06V 10/764 |
| 11,263,222 | B2* | 3/2022 | Misra | G06Q 10/067 |
| 11,501,167 | B2* | 11/2022 | Camilo Gamboa Higuera | G06N 3/006 |
| 11,526,812 | B2* | 12/2022 | Devlin | G06N 3/008 |
| 11,685,045 | B1* | 6/2023 | Herzog | B25J 9/161 |
| | | | | 700/250 |
| 2018/0336480 | A1* | 11/2018 | Chang | G06F 16/252 |
| 2019/0180302 | A1* | 6/2019 | Ventrice | G06Q 30/0211 |
| 2019/0232488 | A1* | 8/2019 | Levine | G05B 13/027 |
| 2019/0354859 | A1* | 11/2019 | Xu | G06N 3/0985 |
| 2020/0250493 | A1* | 8/2020 | Simmons-Edler | G06N 3/045 |
| 2020/0311585 | A1* | 10/2020 | Helenius | G06N 5/01 |
| 2021/0174205 | A1* | 6/2021 | Rosa | G06N 3/044 |
| 2021/0205988 | A1* | 7/2021 | James | B25J 9/163 |
| 2022/0013230 | A1* | 1/2022 | Wu | G16H 50/50 |
| 2022/0019878 | A1* | 1/2022 | Li | G06N 3/044 |
| 2022/0036179 | A1* | 2/2022 | Garg | G06N 3/08 |
| 2022/0105624 | A1* | 4/2022 | Kalakrishnan | B25J 9/163 |
| 2022/0161423 | A1* | 5/2022 | Perez | B25J 9/1664 |
| 2022/0327814 | A1* | 10/2022 | Han | G06V 10/82 |
| 2023/0214649 | A1* | 7/2023 | Jeong | G06N 3/045 |
| | | | | 706/25 |

OTHER PUBLICATIONS

Rasool Fakoor, Pratik Chaudhari, Stefano Soatto, and Alexander J. Smola. Meta-q-learning. In ICLR, Apr. 4, 2020. (Year: 2020).*
Siraj Raval, "Q-learning", working screenshot video available online at [https://www.youtube.com/watch?v=aCEvtRtNO-M], published on 2017 (Year: 2017).*

* cited by examiner

Primary Examiner — Reza Nabi
(74) Attorney, Agent, or Firm — Nicholson De Vos Webster & Elliott LLP

(57) ABSTRACT

Techniques for Meta-Q-Learning (MQL) are described. A method of MQL may include receiving a request from an agent to perform adaptation based at least on task data associated with a new task collected by the agent, identifying a subset of meta-training data corresponding to the task data in a replay buffer, and adapting a policy using the subset of meta-training data and the task data to generate an adapted policy, wherein the adapted policy is used identify a next action for the agent to perform.

20 Claims, 8 Drawing Sheets

META-Q LEARNING

BACKGROUND

Reinforcement Learning (RL) algorithms have demonstrated good performance on simulated data. There are however two main challenges in translating this performance to real world agents (such as connected devices or other computing systems and services): (i) agents are often complex and fragile which precludes extensive data collection, and (ii) a real agent may face an environment that is different than the simulated environment it was trained in. This has fueled research into Meta-Reinforcement Learning (meta-RL) which develops algorithms that "meta-train" on a large number of different environments, e.g., simulated ones, and aim to adapt to a new environment with limited data.

BRIEF DESCRIPTION OF DRAWINGS

Various embodiments in accordance with the present disclosure will be described with reference to the drawings, in which.

DETAILED DESCRIPTION

Figure 1:
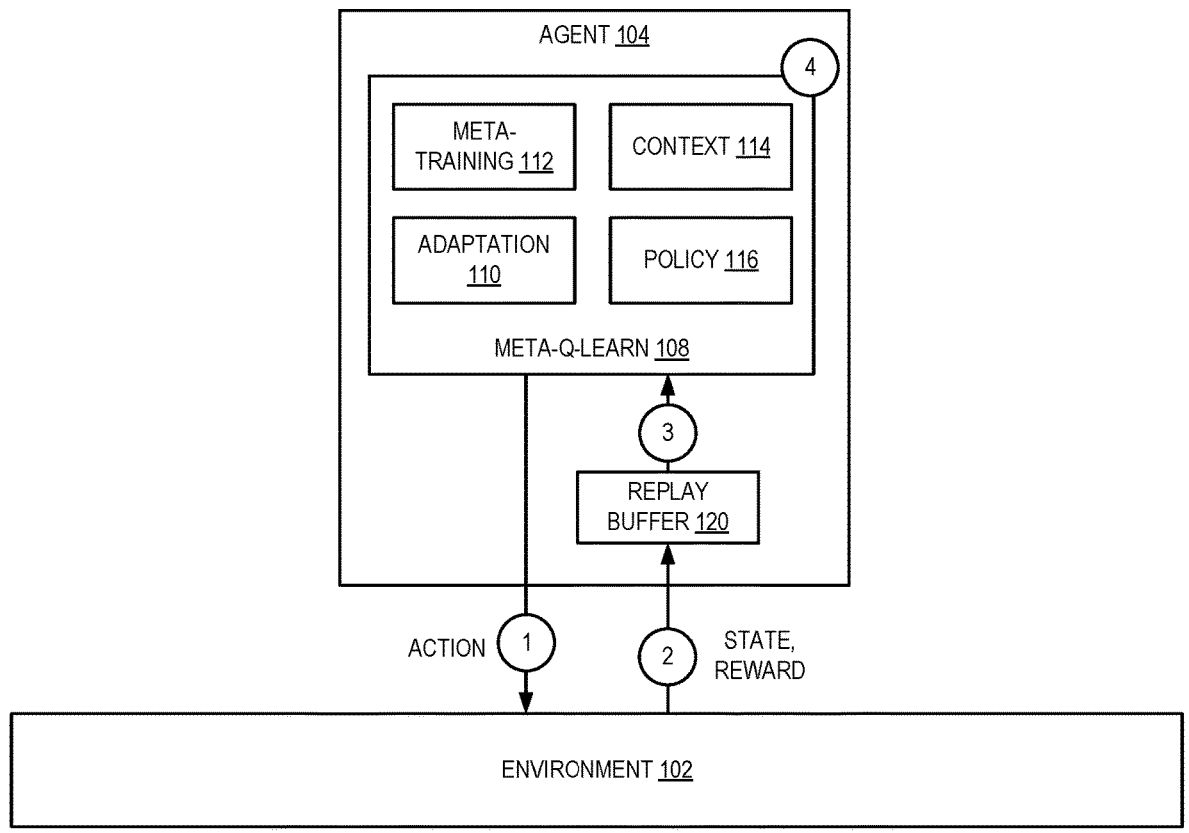
FIG. 1 is a diagram illustrating an environment for performing Meta-Q-Learning (MQL) techniques for meta-reinforcement learning (RL) according to some embodiments.

The present disclosure relates to methods, apparatus, systems, and non-transitory computer-readable storage media for an off-policy meta-reinforcement learning technique referred to herein as Meta-Q-Learning (MQL). According to some embodiments, MQL utilizes a context variable which represents past actions and rewards of an agent, which can be used by the agent to identify the task it is to perform. Additionally, MQL includes a meta-training phase during which the objective is to maximize average reward across a plurality of training tasks. Further, MQL enables past data obtained during the meta-training phase to be used to perform adaptation during the test phase. MQL provides a simplified framework that performs as well or better than existing reinforcement learning (RL) techniques and which can be used to adapt to new tasks much more quickly.

In reinforcement learning, agents perform actions in an environment that are intended to maximize a reward. As the agent takes actions, the resulting rewards can be used to learn a policy which maximizes the cumulative reward. The agent (e.g., robot or other connected device, computing system, service, etc.) obtains data by interacting with its environment. Interacting with the environment can be noisy and sample inefficient, making it difficult and/or costly to obtain. In traditional RL, the task at test time is the same as the task during training. However, in meta-RL, the test task and the training tasks are different. Because of the limited data that can be collected during test time, it can be difficult to adapt to the new task. Existing meta-RL techniques, such as model agnostic meta-learning for fast adaptation (MAML), are complicated and slow.

MQL addresses these shortcomings by formulating the problem as a multi-task learning problem. For example, MQL uses a simple meta-training procedure: it maximizes the average rewards across all meta-training tasks using off-policy updates to obtain:

$$\hat{\theta}_{meta} = \arg\max_\theta \frac{1}{n}\sum_{k=1}^{n} \mathbb{E}_{\tau \sim D^k}\left[l^k(\theta)\right]$$

where $l^k(\theta)$ is the objective evaluated on the transition $\tau$ obtained from the task $D^k(\theta)$, e.g., 1-step temporal-difference (TD) error would set $l^k(\theta)=TD^2(\theta; \tau)$. This objective, which is referred to as the multi-task objective, is the simplest form of meta-training.

For adapting the policy to a new task, MQL samples transitions from the meta-training replay buffer that are similar to those from the new task. This amplifies the amount of data available for adaptation, but it is difficult to do because of the large potential bias. To address this, a propensity score can be used to determine which data from the meta-training replay buffer are similar to the new task. For example, the adaptation phase of MQL solves $$\arg\max_\theta \left\{ \mathbb{E}_{\tau \sim D^{new}}[l^{new}(\theta)] + \mathbb{E}_{\tau \sim \mathcal{D}_{meta}}[\beta(\tau; D^{new}, \mathcal{D}_{meta})l^{new}(\theta)] - (1 - \widehat{ESS})\|\theta - \hat{\theta}_{meta}\|_2^2 \right\}$$

where $\mathcal{D}_{meta}$ is the meta-training replay buffer, the propensity score $\beta(\tau; D^{new}; \mathcal{D}_{meta})$ is the odds of a transition $\tau$ belonging to $D^{new}$ versus $\mathcal{D}_{meta}$, and $\widehat{ESS}$ is the Effective Sample Size between $D^{new}$ and $\mathcal{D}_{meta}$ that is a measure of the similarly of the new task with the meta-training tasks. The first term computes off-policy updates on the new task, the second term performs $\beta(\cdot)$-weighted off-policy updates on old data, while the third term is an automatically adapting proximal term that prevents degradation of the policy during adaptation.

Consider a Markov Decision Processes (MDP) denoted by $$x_{t+1}=f^k(x_t, u_t, \xi_t) x_0 \sim p_0^k;$$

where $x_t \in X \in \mathbb{R}^d$ are the states and $u_t \in U \in \mathbb{R}^p$ are the actions. The dynamics $f^k$ is parameterized by $k \in \{1, \ldots, n\}$ where each k corresponds to a different task. The domain of all these tasks, X for the states and U for the actions, is the same. The distribution $p_0^k$ denotes the initial state distribution and $\xi_t$ is the noise in the dynamics. Given a deterministic policy $u_\theta(x_t)$, the action-value function for $\gamma$-discounted future rewards $r_t^k := r^k(x_t, u_\theta(x_t))$ over an infinite time-horizon is $$q^k(x, u) = \mathbb{E}_{\xi(\cdot)}\left[\sum_{t=0}^{\infty} \gamma^t r_t^k \,\bigg|\, x_0 = x, u_0 = u, u_t = u_\theta(x_t)\right]$$

Note this assumes that different tasks have the same state and action space and may only differ in their dynamics $f^k$ and reward function $r^k$. Given one task $k \in \{1, \ldots, n\}$, the standard Reinforcement Learning (RL) formalism solves for $$\hat{\theta}^k = \arg\max_\theta \ell^k(\theta) \text{ where } \ell^k(\theta) = \mathbb{E}_{x \sim p_0}\left[q^k(x, u_\theta(x))\right]$$

One can denote the dataset of all states, actions and rewards pertaining to a task k and policy $u_\theta(x)$ by $$D^k(\theta) = \{x_t, u_\theta(x_t), r_t^k, x_{t+1} = f^k(x_t, u_\theta(x_t), \xi_t)\}_{t \geq 0, x(0) \sim p_0^k, \xi(\cdot)}$$

As used herein, $D^k$ may refer to the "task" itself. The Deterministic Policy Gradient (DPG) algorithm for solving $\widehat{\theta^k}$ learns a $\varphi$-parameterized approximation $q_\varphi$ to the optimal value function $q^k$ by minimizing the Bellman error and the optimal policy $u_\theta$ that maximizes this approximation by solving the coupled optimization problem:

$$\hat{\varphi}^k = \arg\min_\varphi \mathbb{E}_{\tau \sim D^k}\left[\left(q_\varphi(x, u) - r^k - \gamma q_\varphi(x', u_{\hat{\theta}^k}(x'))\right)^2\right],$$

$$\hat{\theta}^k = \arg\max_\theta \mathbb{E}_{\tau \sim D^k}\left[\left(q_{\hat{\varphi}^k}(x, u_\theta(x))\right)\right].$$

The 1-step temporal difference error (TD error) is defined as:

$$TD^2(\theta) = (q_\varphi(x, u) - r^k - \gamma q_\varphi(x', u_\theta(x')))^2$$

where the dependence of TD(•) on $\varphi$ is kept implicit. DPG, or its deep network-based variant DDPG, is an off-policy algorithm. This means that the expectations in the above coupled optimization problem are computed using data that need not be generated by the policy being optimized ($u_\theta$), this data can come from some other policy.

Meta-RL is a technique to learn an inductive bias that accelerates the learning of a new task by training on a large of number of training tasks. Formally, meta-training on tasks from the meta-training set $\mathcal{D}_{meta} = \{D^k\}_{k=1, \ldots, n}$ involves learning a new policy $$\hat{\theta}_{meta} = \arg\max_\theta \frac{1}{n} \sum_{k=1}^n \ell_{meta}^k(\theta)$$

where $l_{meta}^k(\theta)$ is a meta-training loss that depends on the particular method. Gradient-based meta-RL, such as MAML, sets $$l_{meta}^k(\theta) = l^k(\theta + \alpha \nabla_\theta l^k(\theta))$$

for a step-size $\alpha > 0$; $l^k(\theta)$ is the objective of non-meta-RL. In this case $l_{meta}^k$ is the objective obtained on the task $D^k$ after one (or in general, more) updates of the policy on the task. The idea behind this is that even if the policy $\hat{\theta}_{meta}$ does not perform well on all tasks in $\mathcal{D}_{meta}$ it may be updated quickly on a new task $D^{new}$ to obtain a well-performing policy. This can either be done using the same procedure as that of meta-training time, i.e., by maximizing $l_{meta}^{new}(\theta)$ with the policy $\hat{\theta}_{meta}$ as the initialization, or by some other adaptation procedure. The meta-training method and the adaptation method in meta-RL, and meta-learning in general, can be different from each other.

In supervised learning: given two distributions q(x) (such as a training distribution) and p(x) (such as a testing distribution), one can estimate how a model's predictions $\hat{y}(x)$ change across them using importance sampling:

$$\mathbb{E}_{x \sim p(x)} \mathbb{E}_{y|x}[l(y, \hat{y}(x))] = \mathbb{E}_{x \sim q(x)} \mathbb{E}_{y|x}[\beta(x) l(y, \hat{y}(x))];$$

where y|x are the true labels of data, the predictions of the model are $\hat{y}(x)$ and $l(y, \hat{y}(x))$ is the loss for each datum (x; y). The importance ratio $$\beta(x) = \frac{dp}{dq}(x),$$

also known as the propensity score, is the Radon-Nikodym derivative of the two data densities and measures the odds of a sample x coming from the distribution p versus the distribution q. In practice, the densities q(x) and p(x) are not known and therefore $\beta(x)$ needs to be estimated using some finite data $X_q = \{x_1, \ldots, x_m\}$ drawn from q and $X_p = \{x_1', \ldots, x_m'\}$ drawn from p. This can be performed using logistic regression. Set $z_k = 1$ to be the labels for the data in $X_q$ and $z_k = -1$ to be the labels of the data in $X_p$ for $k \leq m$ and fit a logistic classifier on the combined samples by solving:

$$w^* = \min_w \frac{1}{2m} \sum_{(x,z)} \log(1 + e^{-zw^\top x}) + c\|w\|^2$$

This gives:

$$\beta(x) = \frac{\mathbb{P}(z = -1 \mid x)}{\mathbb{P}(z = 1 \mid x)} = e^{-w^{*\top}x}$$

A related quantity to $\beta(x)$ is the normalized Effective Sample Size ($\widehat{ESS}$) which is defined as the relative number of samples from the target distribution p(x) required to obtain an estimator with performance (e.g., variance) equal to that of the importance sampling estimator $$\mathbb{E}_{x \sim p(x)} \mathbb{E}_{y|x}[l(y, \hat{y}(x))],$$

described above. It is not possible to compute the $\widehat{ESS}$ without knowing both densities q(x) and p(x) but there are many heuristics for estimating it. One option from Monte Carlo is $$\widehat{ESS} = \frac{1}{m} \frac{\left(\sum_{k=1}^m \beta(x_k)\right)^2}{\sum_{k=1}^m \beta(x_k)^2} \in [0, 1]$$

where $X = \{x_1, \ldots, x_m\}$) is a finite batch of data. If two distributions q and p are close, then the $\widehat{ESS}$ is close to one; if they are far apart the $\widehat{ESS}$ is close to zero.

FIG. 1 is a diagram illustrating an environment for performing Meta-Q-Learning (MQL) techniques for meta-reinforcement learning (RL) according to some embodiments. As shown in FIG. 1, an agent 104, such as a connected device, robot, application, etc. The agent 104 interacts with an environment 102 and learns a policy based on the rewards it receives during this interaction. As discussed, agents are often complex and fragile which precludes extensive data collection, and the agent may face an environment that is different than the simulated environment it was trained in.

Embodiments address these challenges using MQL, which enables the agent to learn a context associated with each task it performs. In particular, embodiments described herein utilize a context which represents a history of actions and rewards of an agent to determine what the current task is that the agent is to perform and re-use meta-training data at test-time to improve policy adaptations based on limited test data. As shown, at numeral 1, an agent 104 interacts with an environment 102 (either physical or virtual) according to their policy for a given state. At numeral 2, the agent receives a reward based on their action. Although a single agent is shown, in various embodiments a plurality of agents may be interacting with the environment 102

In various embodiments, the agent 104 may add the action and reward information along with current state to a replay buffer 120 at numeral 3. The agent 104 includes a Meta-Q-Learning module 108 which implements MQL techniques discussed herein. As MQL is an off-policy technique, a new policy can be adapted based on the new trajectory data by adaptation module 110 to replace the initial policy 116. MQL module 108 can sample the replay buffer 120 at numeral 4 to obtain data upon which to adapt the initial policy. As discussed, the MQL module of the agent can be trained during a multi-task meta-training phase. During training, the action, reward, and state data associated with various training tasks is also added to the replay buffer. This training data may also be used, in addition to the data collected related to the agent's current task, to adapt the policy.

For example, the adaptation module 110 can implement a propensity score algorithm to compare the task data (e.g., the action, state, and reward data obtained based on interactions with environment 102) with the meta-training data to identify training data that is similar to the task data. Because the task dataset is limited, any adaptation performed based on this data may also be limited. For example, the agent may collect a few hundred to a couple thousand samples of task data. However, if this data is similar to data collected during training (e.g., if the current task is similar to one or more meta-training tasks), then the task data can be augmented with this training data, greatly increasing the amount of data on which to base the adaptation of the policy. For example, the training data may include many millions of samples, so even a small portion of the training data that is similar to the task data can result in a much larger dataset to use for policy adaptation. In some embodiments, the replay buffer may be randomly sampled to collect a subset of the replay buffer and this subset may then be processed by the adaptation module to determine which samples from this subset are similar to the task data based on the propensity score. Once the new policy has been adapted, the agent can perform its next action based on the adapted policy. This process may continue as long as the agent is deployed to the environment.

Figure 2:
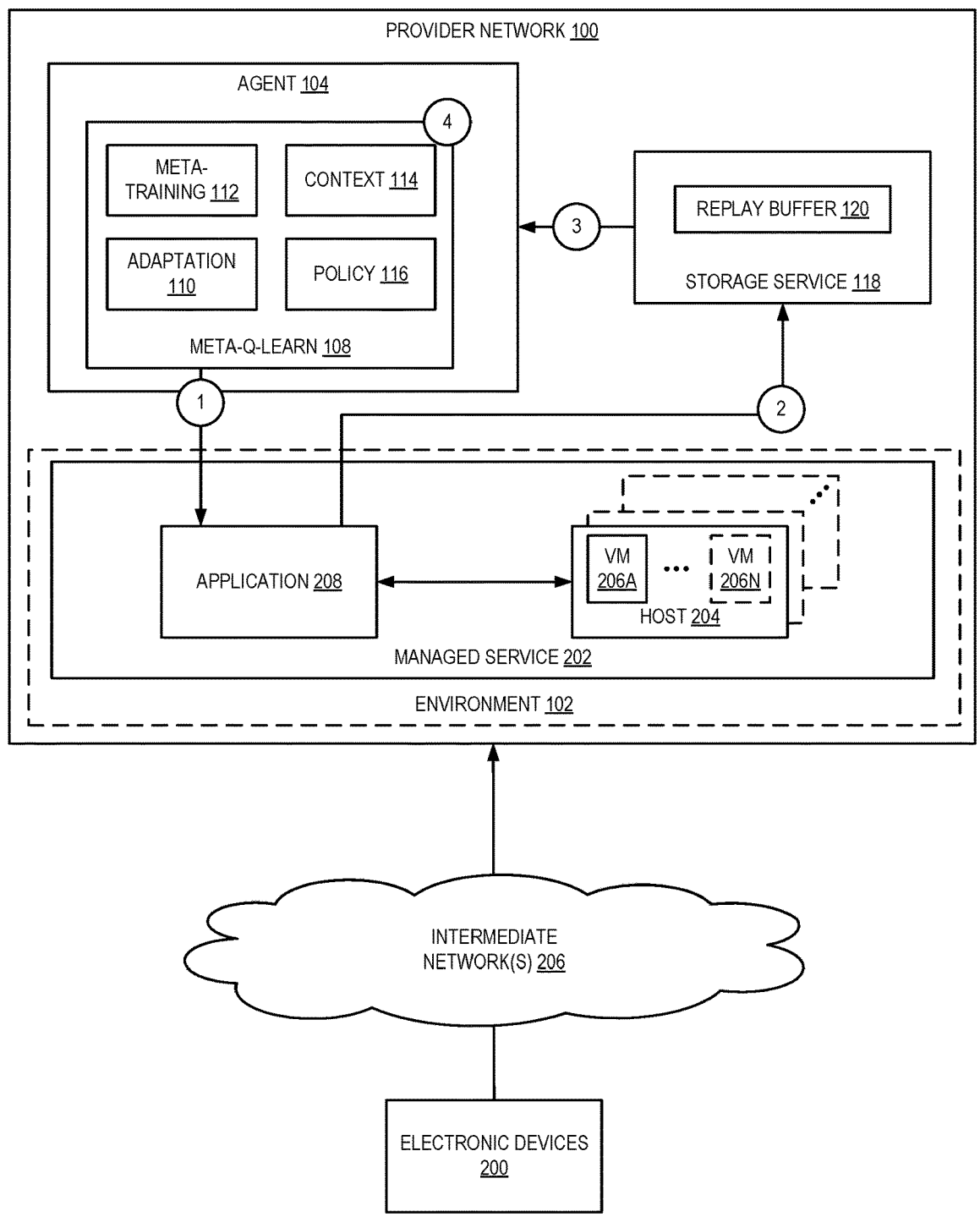
FIG. 2 is a diagram illustrating an environment for performing MQL techniques for meta-RL according to some embodiments.

FIG. 2 is a diagram illustrating an environment for performing MQL techniques for meta-RL according to some embodiments. In the example of FIG. 1, the agent 104 was depicted as a connected device implementing the MQL module and interacting with an environment 102. Embodiments are not limited to agents as connected devices. Instead, agents may be deployed in any environment in which a problem can be formulated for meta-reinforcement learning or where adaptation is needed. This may include software agents deployed as part of a service of provider network 100. In the example of FIG. 2, agent 104 can be deployed to a provider network 100 and can interact with environment 102, which in this example includes a managed service 202, an application 208, and various service resources, such as hosts 204 and/or virtual machines 206A-N. For example, managed service 202 can be a hardware virtualization service, application 208 can be an autoscaling service which manages deployments of hosts and VMs in response to traffic from various users of electronic devices 200.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code-typically without the user having any control of or knowledge of the underlying compute instance(s) involved.

In various embodiments, a "serverless" function may include code provided by a user or other entity-such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As discussed further herein, prior to deploying the agent to the environment, a multi-task meta-training can be performed by meta-training module 112 to determine an initial policy 116. At numeral 4, the action, reward, and state information can be received by the MQL module. This task data (also referred to as test data) can be added to a replay buffer 120 at numeral 5. The replay buffer may include a history of the action, reward, and state information collected by the agent by interacting with the environment (also referred to as the agent's trajectory) and may additionally include data collected during meta-training. The replay buffer may be provided as a storage location in a storage service 118 or onboard agent 104. Using the trajectory data, context 114 can identify the task which the agent is to perform. For example, the context 114 may implement a machine learning model which encodes recent subset of the trajectory into an embedding. This embedding can then be compared to embeddings associated with the tasks from the multi-task training to identify a most similar task.

As shown in FIG. 2, agent 104 can learn to perform a task by interacting with application 208 at numeral 1 based on the policy 116 and the current state of agent 104, causing application 208 to perform one or more actions on the resources of the managed service. Based on the actions application 208 is caused to perform, a reward or penalty can be received by the agent and the agent can update its current state information. This action, reward, and state information can be stored to a replay buffer 120 in storage service 118, as shown in numeral 2. At numeral 3, the agent 104 can sample the data from the replay buffer 120. As discussed, the replay buffer can include the data from the task as well as past data that was generated during training. At numeral 4, the MQL module can adapt policy 116 based on the sampled data from the replay buffer. For example, this may include task data as well as training data that is identified as being similar to the task data based on the context 114 and a propensity score calculated by the adaptation module 110. Once the policy has been adapted, the new adapted policy along with the current state of the agent 104 can be used to perform a next action in environment 102. This process may continue as long as the agent is deployed to the environment.

As discussed, in one embodiment, the managed service may be a hardware virtualization service and the application 208 may be an autoscaling service. A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As shown in FIG. 2, traffic can be received by one or more hosts 204 of hardware virtualization service 202 from electronic devices 200 over one or more intermediate networks 106. The autoscaling service (e.g., application 208) can monitor this traffic and host/virtual machine performance (e.g., utilization, etc.). The current state of the agent 104 may be based at least in part on this traffic and performance data collected by the autoscaling service. At numeral 1, the MQL module 108 can instruct the autoscaling service to perform an action (e.g., scale-up, scale-down, or make no changes). The autoscaling service can perform the action, obtain a reward or penalty (e.g., based on the change in the performance data), and provide the trajectory information to the replay buffer at numeral 2.

At numeral 3, the MQL module 108 can sample data from the replay buffer. As discussed, this may include both the task data (e.g., generated while learning to autoscale) as well as training data that was generated during meta-training of the agent. At numeral 4, the MQL module can identify data similar to the trajectory data in the replay buffer 120 and using the trajectory data and the similar training data (or a sampling of similar training data) adapt a new policy for the agent. A next action will then be chosen based on the adapted policy and the current state of the agent. This process may continue as long as the agent is deployed to the environment.

Figure 3:
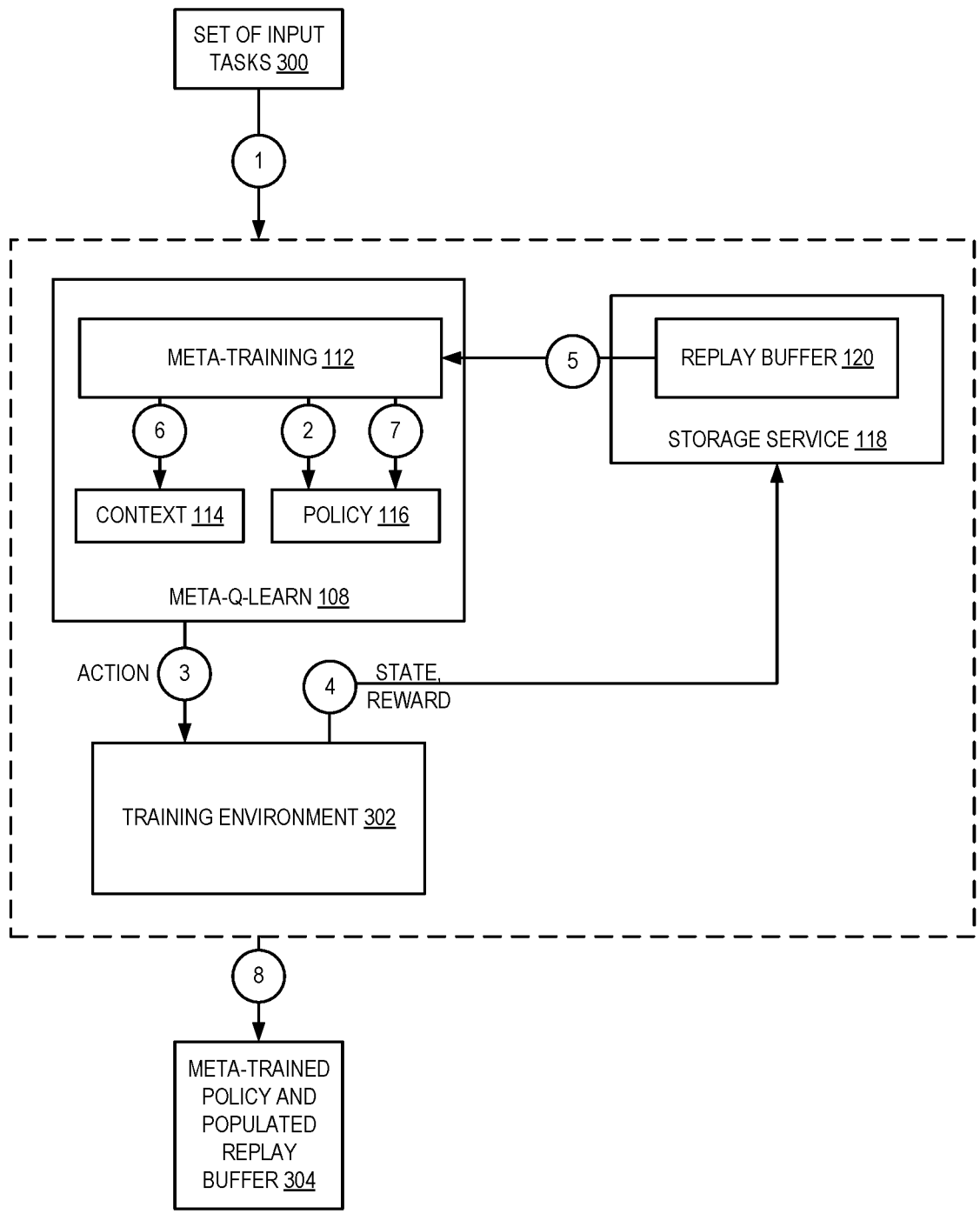
FIG. 3 is a diagram illustrating an environment for meta-training in MQL according to some embodiments.

FIG. 3 is a diagram illustrating an environment for meta-training in MQL according to some embodiments. As discussed, MQL performs meta-training using the multi-task objective. At numeral 1, the set of input tasks 400 can be received by meta-training module 112. In multi-task learning, if there are N different tasks to be learned, then the goal can be to maximize the expected average reward of the N tasks. In some embodiments, at the beginning of meta-training, the replay buffer 120 can be initialized. For example, the replay buffer can be allocated in storage service 118 or in memory (not shown). At numeral 2, the parameters of the policy 116 can be initialized. Note that if one sets $$\ell^k_{meta}(\theta) \triangleq \ell^k(\theta) = \underset{x \sim P_0^k}{\mathbb{E}} \left[ q^k(x, u_\theta(x)) \right]$$

in the policy $\hat{\theta}_{meta}$ described above, then the parameters $\hat{\theta}_{meta}$ are such that they maximize the average returns over all tasks from the meta-training set 300. Using an off-policy algorithm, such as Twin Delayed Deep Deterministic Policy Gradients (TD3), as the building block and solving for $\hat{\theta}_{meta}$ results in:

$$\hat{\theta}_{meta} = \arg\min_\theta \frac{1}{n} = \sum_{k=1}^{n} \underset{\tau \sim D^k}{\mathbb{E}} \left[ TD^2(\theta) \right]$$

where TD(•) is defined as described above. As is standard in TD3, embodiments use two action-value functions parameterized by $\varphi_1$ and $\varphi_2$ and take their minimum to compute the target as described above in the temporal difference error equation. This may be referred to as "double-Q-learning" and reduces the over-estimation bias.

At numeral 3, actions are performed in the training environment 302. For example, a particular task from the set of training tasks can be performed and new states and rewards are observed and stored in the replay buffer at numeral 4. At numeral 5, the replay buffer 120 can be sampled to be used to perform adaptation by the MQL module. For example, these transitions can be passed through context 114 at numeral 6 to learn a context variable associated with each training task. The identity of the task in meta-RL can be thought of as the hidden variable of an underlying partially-observable MDP. The optimal policy on the entire trajectory of the states, actions, and the rewards. Context 114 can therefore be defined as a recurrent context variable $z_t$ that depends on $\{x_i, y_i, r_i\}_{i \leq t}$. The context variable z, is set to the hidden state at time t of a Gated Recurrent Unit (GRU) model. All the policies $u_\theta(x)$ and value functions $q_\varphi(x, u)$ in MQL are conditioned on the context and implemented as $u_\theta(x, z)$ and $q_\varphi(x, u, z)$. Any other recurrent model can be used to design the context.

The context 114 in MQL is built using a recurrent model like GRU and is not permutation invariant. Indeed, the direction of time affords crucial information about the dynamics of a task to the agent, e.g., a Half-Cheetah running forward versus backward has arguably the same state trajectory but in a different order. Further, the context in MQL is a deterministic function of the trajectory. Both these aspects are different than the context used by prior techniques which design an inference network and sample a probabilistic context conditioned on a moving window, resulting in a much more complex system.

The data sampled from the replay buffer can be used to update policy parameters numeral 7. The updated policy parameters can be used to generate the meta-trained policy $\hat{\theta}_{meta}$. This process can continue until all tasks in the set of tasks 300 have been performed, at which point the meta-trained policy 116 can be returned along with the replay buffer populated with training data from the meta-training process at numeral 8.

Figure 4:
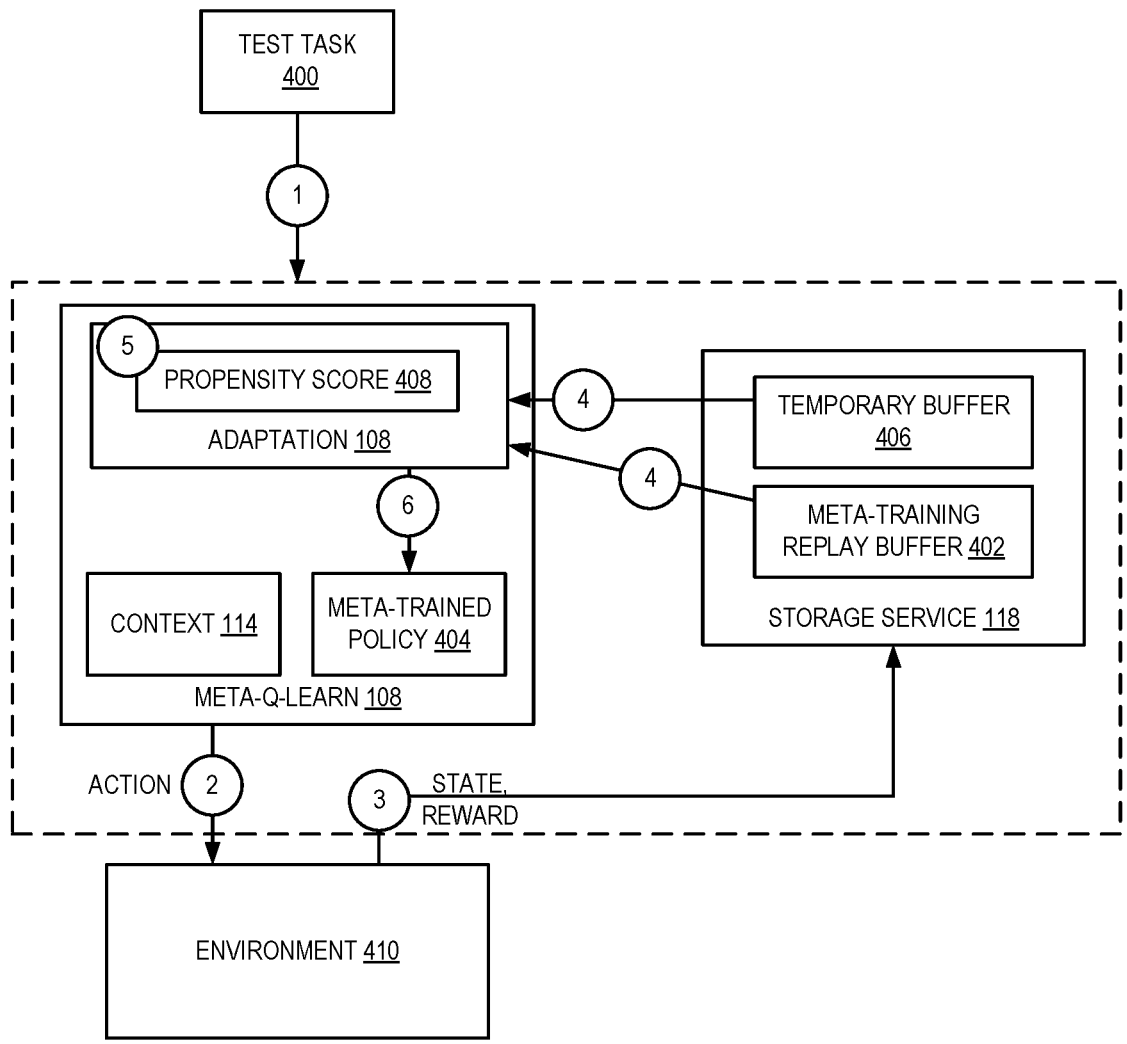
FIG. 4 is a diagram illustrating an environment for adaptation to a new task in MQL according to some embodiments.

FIG. 4 is a diagram illustrating an environment for adaptation to a new task in MQL according to some embodiments. The example of FIG. 4 illustrates the adaptation procedure which adapts the meta-trained policy $\hat{\theta}_{meta}$ to a new task $D^{new}$ with few data samples. At numeral 1, the MQL module can receive data associated with a new test task 400. In some embodiments, when a new task is received, a temporary buffer 406 can be allocated. In the example, of FIG. 2, the temporary buffer is allocated in a storage service, however in various embodiments the temporary buffer can be allocated in memory (e.g., on an agent connected device), disk, or other storage medium. Additionally, although a temporary buffer and meta-training replay buffer are shown, in some embodiments, a single buffer can include both the meta-training data (e.g., generated as discussed above with respect at least to FIG. 3) and the task data generated in performing the new test task 400 by interacting with the environment. At numeral 2, the MQL module 108 can perform actions in environment 410 based on the meta-trained policy 404 and observe new state and obtain rewards or penalties based on the actions. At numeral 3 this data can be stored in temporary buffer 406.

In some embodiments, MQL optimizes the adaptation objective introduced in (2) into two steps.

The first step is to update the policy using the new data as $$\arg\max_{\theta} \left\{ \mathbb{E}_{\tau \sim D^{new}}[\ell^{new}(\theta)] - \frac{\lambda}{2}\|\theta - \hat{\theta}_{meta}\|_2^2 \right\}$$

The quadratic penalty $\|\theta - \hat{\theta}_{meta}\|^2$ keeps the parameters close to $\hat{\theta}_{meta}$. This reduces the variance of the model that is adapted using few data samples from the new task. Off-policy learning here is useful because of its sample efficiency. In some embodiments, $\theta$ can be initialized to $\theta_{meta}$ in the above equation.

The second step of MQL exploits the meta-training replay buffer. Meta-training tasks $\mathcal{D}_{meta}$ are disjoint from $D^{new}$ but because they are expected to come from the same task distribution, transitions collected during meta-training can potentially be exploited to adapt the policy. This is difficult to do on two counts. First, the meta-training transitions do not come from Drew Second, even for transitions from the same task, it is non-trivial to update the policy because of extrapolation error: the value function has high error on states it has not seen before. At numeral 4, the task data can be sampled from the temporary buffer 406 and the meta-training data can be sampled from the replay buffer 402 to be used for adaptation.

MQL fits a logistic classifier on a mini-batch of transitions from the meta-training replay buffer and the transitions collected from the new task in step 1. The context variable 114 $z_t$ is the feature for this classifier. The logistic classifier estimates the propensity score 408 (e.g., importance ratio) $\beta(\tau; D^{new}, \mathcal{D}_{meta})$ at numeral 5 and can be used to reweigh data from the meta-training replay buffer for taking updates as $$\arg\max_{\theta} \left\{ \mathbb{E}_{\tau \sim \mathcal{D}_{meta}} [\beta(\tau; D^{new}, \mathcal{D}_{meta})\ell^{new}(\theta)] - \frac{\lambda}{2}\|\theta - \hat{\theta}_{meta}\|_2^2 \right\}$$

Once again, a quadratic penalty $\|\theta - \hat{\theta}_{meta}\|^2$ is included to keep the parameters close to $\hat{\theta}_{meta}$. Estimating the importance ratio involves solving a convex optimization problem on few samples (typically, 200 from the new task and 200-400 from the meta-training tasks). This classifier allows MQL to exploit the large amount of past data. In practice, the MQL system performs as many as 100× more weight updates using the equation of step 2 than the equation of step 1. At numeral 6, the policy parameters $\theta$ can be determined as described above based on the collected task data and the similar meta-training data identified using the propensity score, and these parameters can be used to adapt the policy and the adapted policy can be used to determine a next action to be performed.

In some embodiments, the coefficient $\lambda$ can be defined as $\lambda = 1 - \widehat{ESS}$ for both the steps described above. This relaxes the quadratic penalty if the new task is similar to the meta-training tasks ($\widehat{ESS}$ is large) and vice-versa. While $\lambda$ could be tuned as a hyper-parameter, empirical results show that adapting it using $\widehat{ESS}$ is a simple and effective heuristic.

Figure 5:
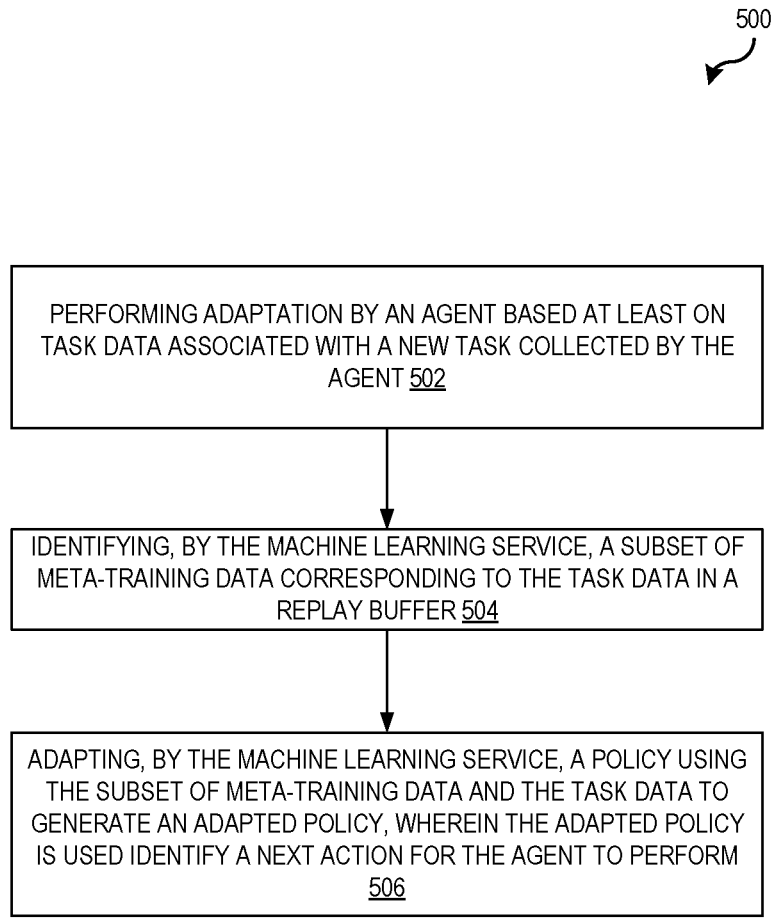
FIG. 5 is a flow diagram illustrating operations of a method for meta-q-learning according to some embodiments.

FIG. 5 is a flow diagram illustrating operations 500 of a method for meta-q-learning according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by agent 104, MQL module 108, etc. of the other figures.

The operations 500 include, at block 502, performing adaptation by an agent based at least on task data associated with a new task collected by the agent. In some embodiments, the agent one of a connected device, robot, or a service of a provider network.

The operations 500 further include, at block 504, identifying a subset of meta-training data corresponding to the task data in a replay buffer. In some embodiments, identifying the subset can include sampling the meta-training data from the replay buffer, the meta-training data associated with a plurality of tasks from a multi-task training phase, determining a propensity score between the sampled meta-training data from the replay buffer and the task data, and determining the subset of the meta-training data using the propensity score. In some embodiments, the propensity score indicates a similarity between the new task and at least one task from the set of training tasks and is estimated based at least on the context. In some embodiments, the context represents past trajectory of the agent.

The operations 500 further include, at block 506, adapting a policy using the subset of meta-training data and the task data to generate an adapted policy, wherein the adapted policy is used identify a next action for the agent to perform. In some embodiments, the operations further include performing the next action based on a current state of the agent and the adapted policy. In some embodiments, the operations further include sampling the task data from a temporary buffer, the task data generated based at least on prior interactions with the environment by the agent while performing the new task.

In some embodiments, the operations further include meta-training an initial policy using a set of training tasks, wherein the initial policy is trained to maximize an average reward across the set of training tasks. In some embodiments, meta-training may include, for each task in the set of tasks meta-training interacting with a training environment to obtain task data, updating a context based on the task data, storing the task data in the replay buffer, and updating parameters for the policy based on the training data to create a meta-trained policy.

In some embodiments, the operations include receiving a set of training tasks, initializing a replay buffer and parameters for a policy, for each task in the set of tasks obtaining training data for the task by interacting with an environment, updating a context variable based on the training data, storing the training data in the replay buffer, and updating the parameters for the policy based on the training data to create a meta-trained policy, and performing adaptation on the meta-trained model using the task data and a subset of the training data to generate an adapted meta-trained policy, wherein the subset of the training data is identified using the context variable and a propensity score.

In some embodiments, the context variable represents past action and reward data associated with the set of training tasks. In some embodiments, the propensity score is estimated using a classifier and indicates a similarity between the new task and at least one task from the set of training tasks.

Figure 6:
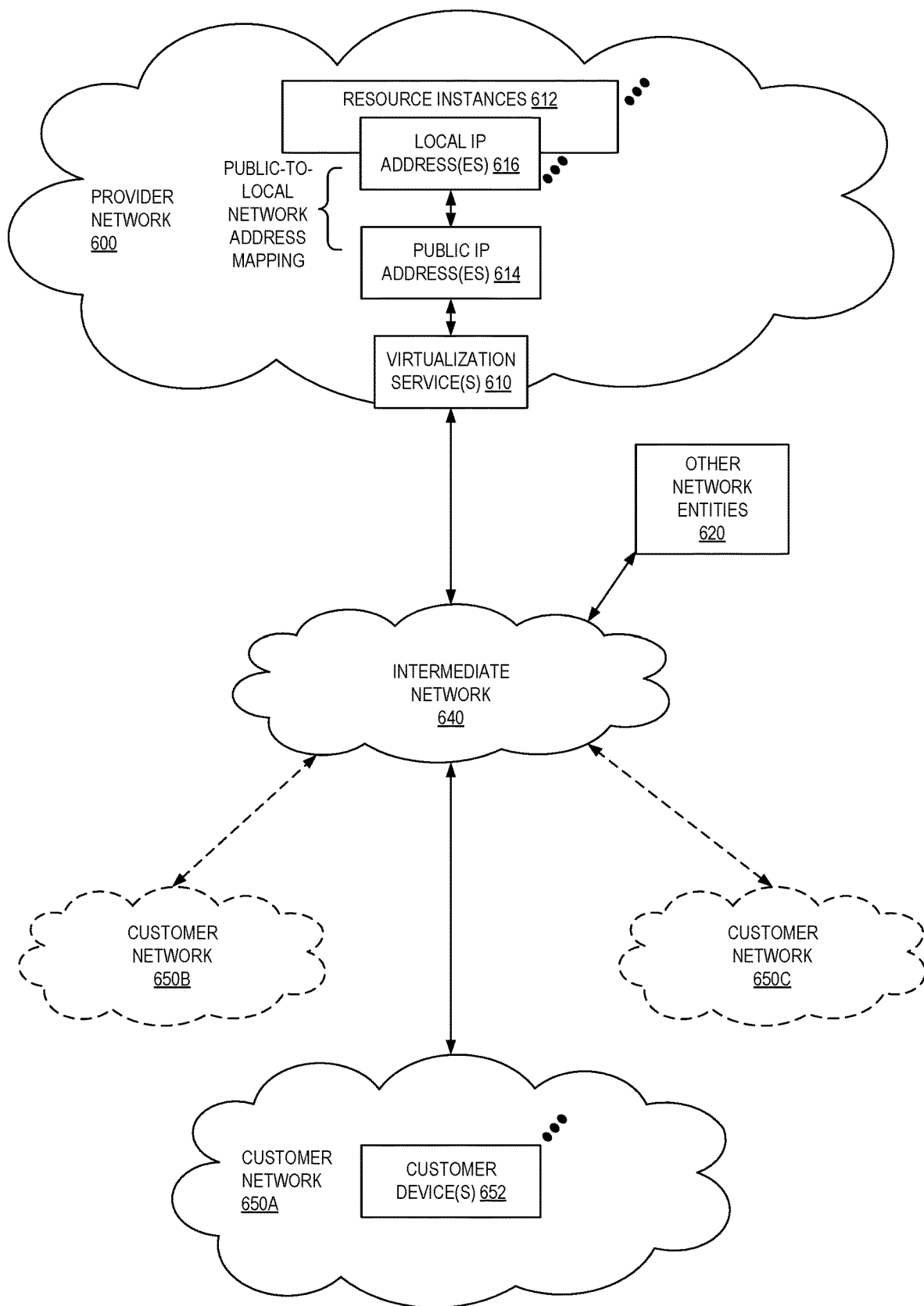
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
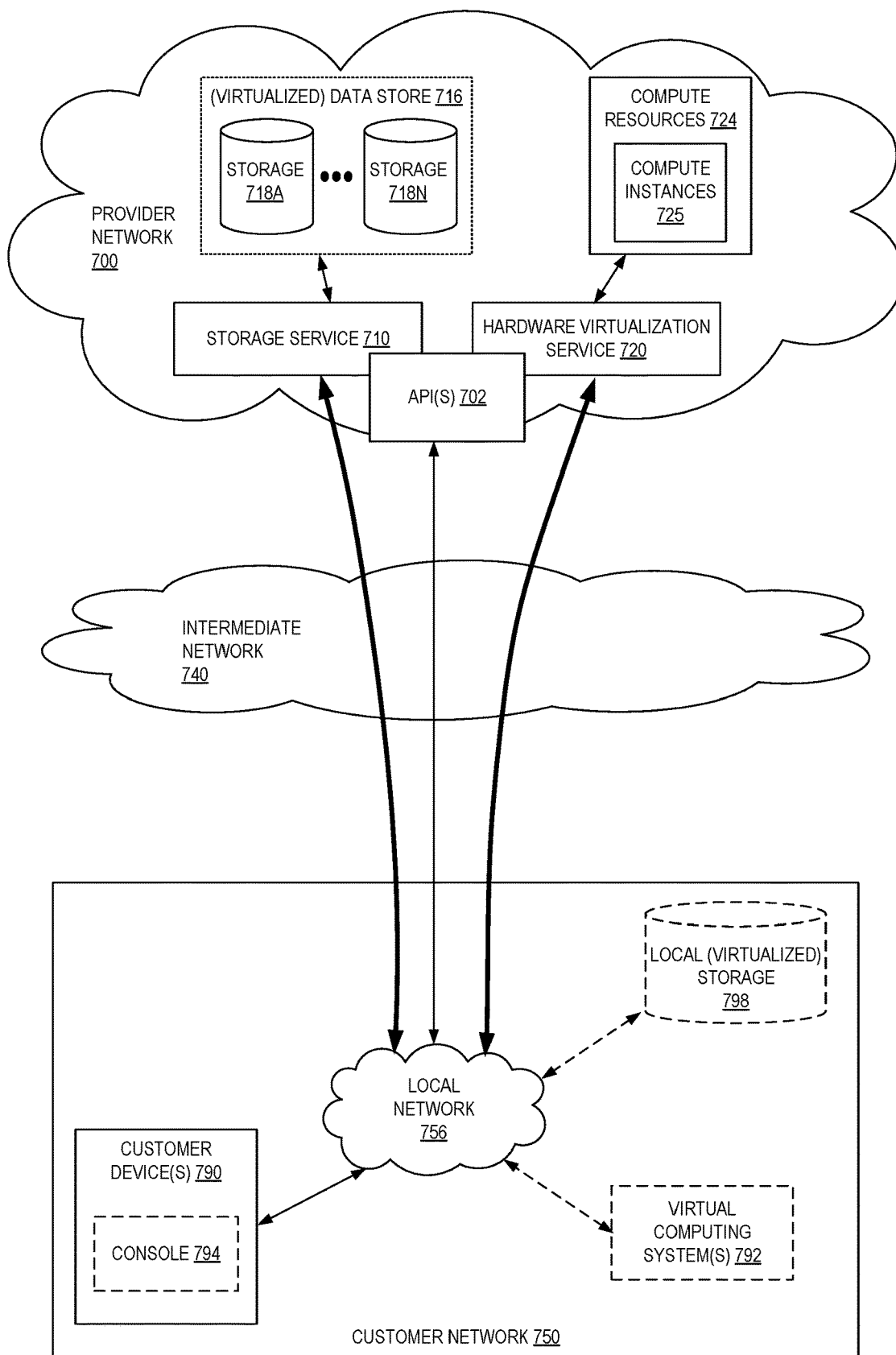
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
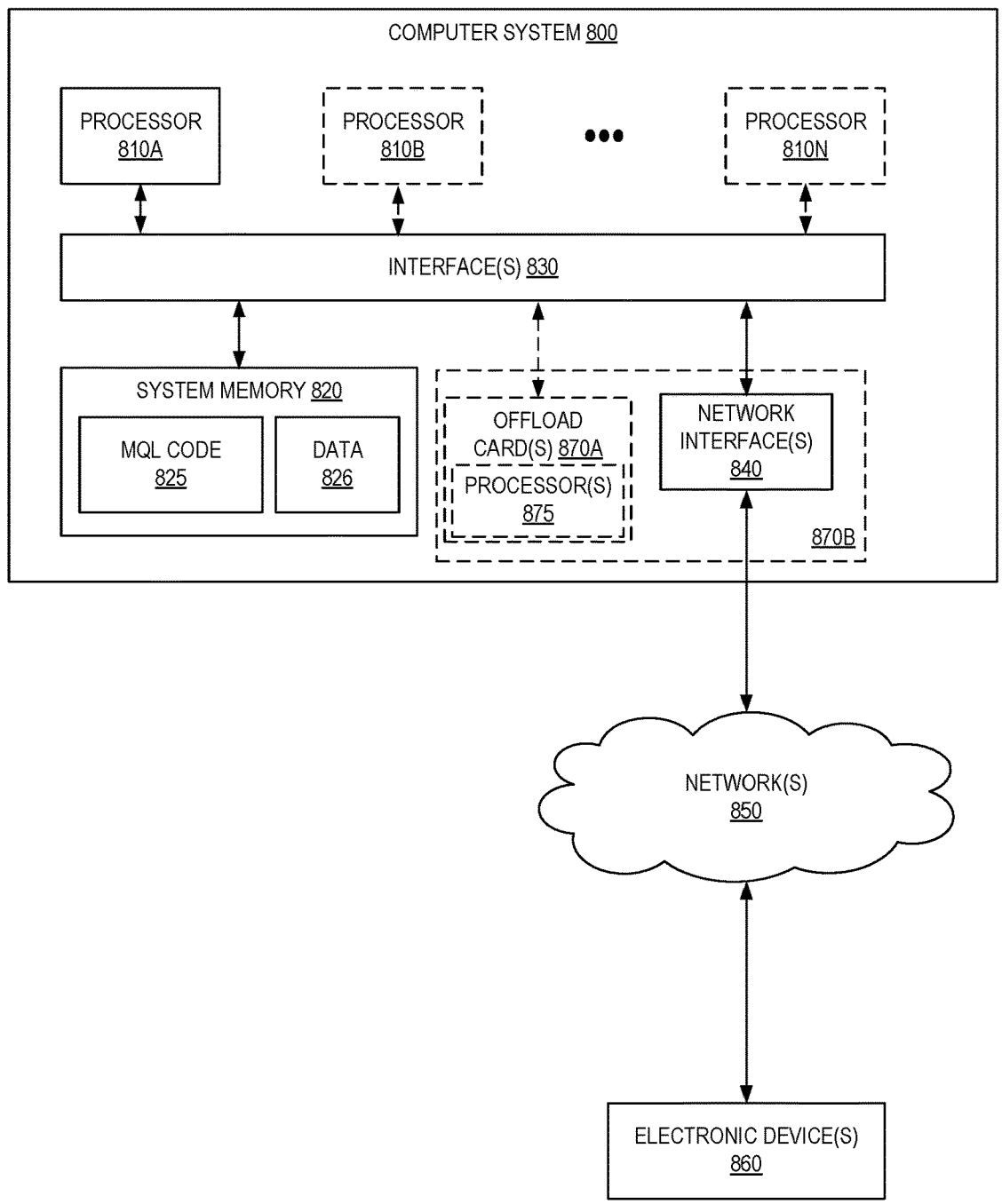
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 (e.g., executable to implement, in whole or in part, the MQL 108) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s)

870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a set of training tasks;
initializing a replay buffer and parameters for a policy;
for each training task in the set of training tasks:
    obtaining training data for the training task by interacting with an environment;
    updating a context variable based on the training data;
    storing the training data in the replay buffer; and
    updating the parameters for the policy based on the training data to create a meta-trained policy;
performing adaptation on the meta-trained policy using task data and a subset of the training data to generate an adapted meta-trained policy, wherein the subset of the training data is identified using the context variable and a propensity score, wherein the propensity score indicates a similarity between the task data and at least one training task from the set of training tasks.

2. The computer-implemented method of claim 1, wherein the context variable represents past action and reward data associated with the set of training tasks.

3. The computer-implemented method of claim 1, wherein the propensity score is estimated using a classifier.

4. A computer-implemented method comprising:
performing, by an agent, adaptation based at least on task data associated with a new task collected by the agent;
identifying, by the agent in a replay buffer using a propensity score, a subset of meta-training data corresponding to the task data, wherein the propensity score indicates a similarity between the new task and at least one training task from a set of training tasks;
adapting a policy using the subset of meta-training data and the task data to generate an adapted policy; and
identifying a next action for the agent to perform using the adapted policy.

5. The computer-implemented method of claim 4, further comprising meta-training an initial policy using a set of training tasks, wherein the initial policy is trained to maximize an average reward across the set of training tasks.

6. The computer-implemented method of claim 5, wherein meta-training an initial policy using the set of training tasks, wherein the initial policy is trained to maximize an average reward across the set of training tasks, further comprises for each training task in the set of training tasks:
interacting with a training environment to obtain task data;
updating a context based on the task data;
storing the task data in the replay buffer; and
updating parameters for the policy based on the meta-training data to create a meta-trained policy.

7. The computer-implemented method of claim 6, wherein identifying a subset of meta-training data corresponding to the task data in a replay buffer further comprises:
sampling the meta-training data from the replay buffer, the meta-training data associated with a plurality of tasks from a multi-task training phase;

determining the propensity score between the sampled meta-training data from the replay buffer and the task data; and determining the subset of the meta-training data using the propensity score.

8. The computer-implemented method of claim 7, wherein the propensity score is estimated based at least on the context.

9. The computer-implemented method of claim 8, wherein the context represents past trajectory of the agent.

10. The computer-implemented method of claim 6, wherein the context implements a machine learning model that encodes a recent subset of a past trajectory of the agent into an embedding and compares the embedding to embeddings associated with the set of training tasks to identify a most similar task.

11. The computer-implemented method of claim 4, further comprising performing the next action based on a current state of the agent and the adapted policy.

12. The computer-implemented method of claim 4, further comprising sampling the task data from a temporary buffer, the task data generated based at least on prior interactions with an environment by the agent while performing a new task.

13. A system comprising:
a first one or more electronic devices to implement a storage service in a multi-tenant provider network; and
a second one or more electronic devices to implement a Meta-Q-Learning (MQL) agent in the multi-tenant provider network, the MQL agent including instructions that upon execution by one or more processors cause the MQL agent to:
perform adaptation based at least on task data associated with a new task collected by the MQL agent;
identify, in a replay buffer of the storage service using a propensity score, a subset of meta-training data corresponding to the task data, wherein the propensity score indicates a similarity between the new task and at least one training task from a set of training tasks;
adapt a policy using the subset of meta-training data and the task data to generate an adapted policy; and
identify a next action for the MQL agent to perform using the adapted policy.

14. The system of claim 13, wherein the instructions, when executed, further cause the MQL agent to meta-train an initial policy using a set of training tasks, wherein the initial policy is trained to maximize an average reward across the set of training tasks.

15. The system of claim 14, wherein to meta-train an initial policy using the set of training tasks, wherein the initial policy is trained to maximize an average reward across the set of training tasks, the instructions, when executed, further cause the MQL agent to:
for each training task in the set of training tasks:
interact with a training environment to obtain task data;
update a context based on the task data;
store the task data in the replay buffer; and
update parameters for the policy based on the meta-training data to create a meta-trained policy.

16. The system of claim 15, wherein to identify a subset of meta-training data corresponding to the task data in a replay buffer in the storage service, the instructions, when executed, further cause the MQL agent to:
sample the meta-training data from the replay buffer, the meta-training data associated with a plurality of tasks from a multi-task training phase;
determine the propensity score between the sampled meta-training data from the replay buffer and the task data; and
determine the subset of the meta-training data using the propensity score.

17. The system of claim 16, wherein the propensity score is estimated based at least on the context.

18. The system of claim 17, wherein the context represents past trajectory of the MQL agent.

19. The system of claim 13, wherein the instructions, when executed, further cause the MQL agent to identify the next action to perform based at least on a current state of the MQL agent and the adapted policy.

20. The system of claim 13, wherein the instructions, when executed, further cause the MQL agent to sample the task data from a temporary buffer, the task data generated based at least on prior interactions with an environment by the agent while performing the new task.

* * * * *